US012584514B2

(12) United States Patent
Futae et al.

(10) Patent No.: US 12,584,514 B2
(45) Date of Patent: Mar. 24, 2026

(54) GAS BEARING DEVICE AND TURBOCHARGER

(71) Applicant: MITSUBISHI HEAVY INDUSTRIES ENGINE & TURBOCHARGER, LTD., Sagamihara (JP)

(72) Inventors: Takaya Futae, Tokyo (JP); Shuichi Isayama, Tokyo (JP); Toru Suzuki, Tokyo (JP); Naomichi Shibata, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 133 days.

(21) Appl. No.: 18/277,209

(22) PCT Filed: Feb. 21, 2022

(86) PCT No.: PCT/JP2022/006818
    § 371 (c)(1),
    (2) Date: Aug. 14, 2023

(87) PCT Pub. No.: WO2022/181510
    PCT Pub. Date: Sep. 1, 2022

(65) Prior Publication Data
    US 2024/0141952 A1     May 2, 2024

(30) Foreign Application Priority Data
    Feb. 26, 2021     (JP) ................................. 2021-030501

(51) Int. Cl.
    *F16C 17/02*          (2006.01)
(52) U.S. Cl.
    CPC ........ *F16C 17/024* (2013.01); *F05D 2220/40* (2013.01); *F16C 2360/24* (2013.01)

(58) Field of Classification Search
    CPC ...................................................... F16C 17/024
    See application file for complete search history.

(56) References Cited

U.S. PATENT DOCUMENTS 9,360,042 B2     6/2016 Thompson et al.
2011/0171020 A1*   7/2011 Spathias ............... F04D 29/056
                                                        384/103
(Continued)

FOREIGN PATENT DOCUMENTS

JP         63-166719 U     10/1988
JP         7-293559 A      11/1995
(Continued)

OTHER PUBLICATIONS

Translation of KR20210115228 obtained Feb. 19, 2025.*
(Continued)

*Primary Examiner* — James Pilkington
(74) *Attorney, Agent, or Firm* — Birch, Stewart, Kolasch & Birch, LLP

(57) ABSTRACT

A gas bearing device using a gas as a working fluid, including: a rotational shaft; a housing where the rotational shaft penetrates; an annular top foil disposed inside the housing and surrounding an outer periphery of the rotational shaft; a back spring disposed between the top foil and the housing, and having a plurality of crests contacting the top foil and a plurality of valleys contacting the housing; and a pair of snap rings fitted in shaft holes where the rotational shaft of the housing penetrates, and configured to restrict movement of the back spring in an axial direction of the rotational shaft. The gas bearing device has a turning groove inclined with respect to an axis of the rotational shaft, in at least one of the pair of snap rings or in a region of the rotational shaft facing at least one of the pair of snap rings.

5 Claims, 8 Drawing Sheets

(56) References Cited

U.S. PATENT DOCUMENTS

2015/0362012 A1    12/2015  Ermilov
2024/0125349 A1*    4/2024  Shinoda .................. F16C 33/08

FOREIGN PATENT DOCUMENTS

| JP | 2004-92771  A   | 3/2004 |
| JP | 2020-122555 A   | 8/2020 |
| KR | 10-0938919  B1  | 1/2010 |
| KR | 20210115228 A  * | 9/2021 |

OTHER PUBLICATIONS

International Preliminary Report on Patentability and Written Opinion of the International Searching Authority for International Application No. PCT/JP2022/006818, dated Sep. 7, 2023, with an English translation.
International Search Report for International Application No. PCT/JP2022/006818, dated May 17, 2022.

* cited by examiner 19          15          17

9

19          15          17

9

19          15          17

GAS BEARING DEVICE AND TURBOCHARGER

TECHNICAL FIELD

The present disclosure relates to a gas bearing device and a turbocharger.

This application claims the priority of Japanese Patent Application No. 2021-030501 filed on Feb. 26, 2021, the content of which is incorporated herein by reference.

BACKGROUND

Patent Document 1 discloses a gas bearing device that includes a ring-shaped top foil into which a rotatable cylindrical rotational shaft is inserted and an inner peripheral surface of which is spaced from an outer peripheral surface of the rotational shaft, a damping member which is disposed on an outer periphery of the top foil and is configured to damp vibration in a direction intersecting an axis of the rotating rotational shaft, and a ring-shaped housing disposed on an outer periphery of the damping member.

CITATION LIST

Patent Literature

Patent Document 1: JP2020-122555A

SUMMARY

Technical Problem

However, since the viscosity of gas is lower than that of oil, a load capability of the gas bearing device is low, which may increase a mechanical loss under low-speed rotation/high surface pressure. In addition, since cooling performance of gas is lower than that of oil, there is concern that a temperature of a bearing section (top foil) may rise due to the mechanical loss during high-speed rotation of the rotational shaft.

The present disclosure has been made in view of the above-described problems, and the object of the present disclosure is to provide a turbocharger and a gas bearing device capable of suppressing the temperature rise of the top foil due to the mechanical loss during rotation of the rotational shaft.

Solution to Problem

In order to achieve the above object, a gas bearing device according to the present disclosure is a gas bearing device using a gas as a working fluid, including: a rotational shaft; a housing where the rotational shaft penetrates; an annular top foil disposed inside the housing and surrounding an outer periphery of the rotational shaft; a back spring disposed between the top foil and the housing, and having a plurality of crests contacting the top foil and a plurality of valleys contacting the housing; and a pair of snap rings fitted in shaft holes where the rotational shaft of the housing penetrates, and configured to restrict movement of the back spring in an axial direction of the rotational shaft. The gas bearing device has a turning groove inclined with respect to an axis of the rotational shaft, in at least one of the pair of snap rings or in a region of the rotational shaft facing at least one of the pair of snap rings.

Advantageous Effects

According to the gas bearing device of the present disclosure, since air is introduced between the rotational shaft and the top foil by rotation of the rotational shaft and the rotational shaft and the top foil are cooled, it is possible to suppress a temperature rise of the top foil due to a mechanical loss during rotation of the rotational shaft.

BRIEF DESCRIPTION OF DRAWINGS

FIG. 4-1 is a front view of a snap ring shown in FIG. 2.

FIG. 4-2 is a transverse cross-sectional view (cross-sectional view taken along line A-A) of the snap ring shown in FIG. 4-1.

FIG. 7-1 is a view (cross-sectional view) conceptually showing a relationship between the snap rings and a back spring, the view showing a state before a rotational shaft is installed.

FIG. 7-2 is a view (cross-sectional view) conceptually showing the relationship between the snap rings and the back spring, the view showing a state during low-speed rotation of the rotational shaft.

FIG. 7-3 is a view (cross-sectional view) conceptually showing the relationship between the snap rings and the back spring, the view showing a state during medium-speed rotation of the rotational shaft.

DETAILED DESCRIPTION

Figure 1:
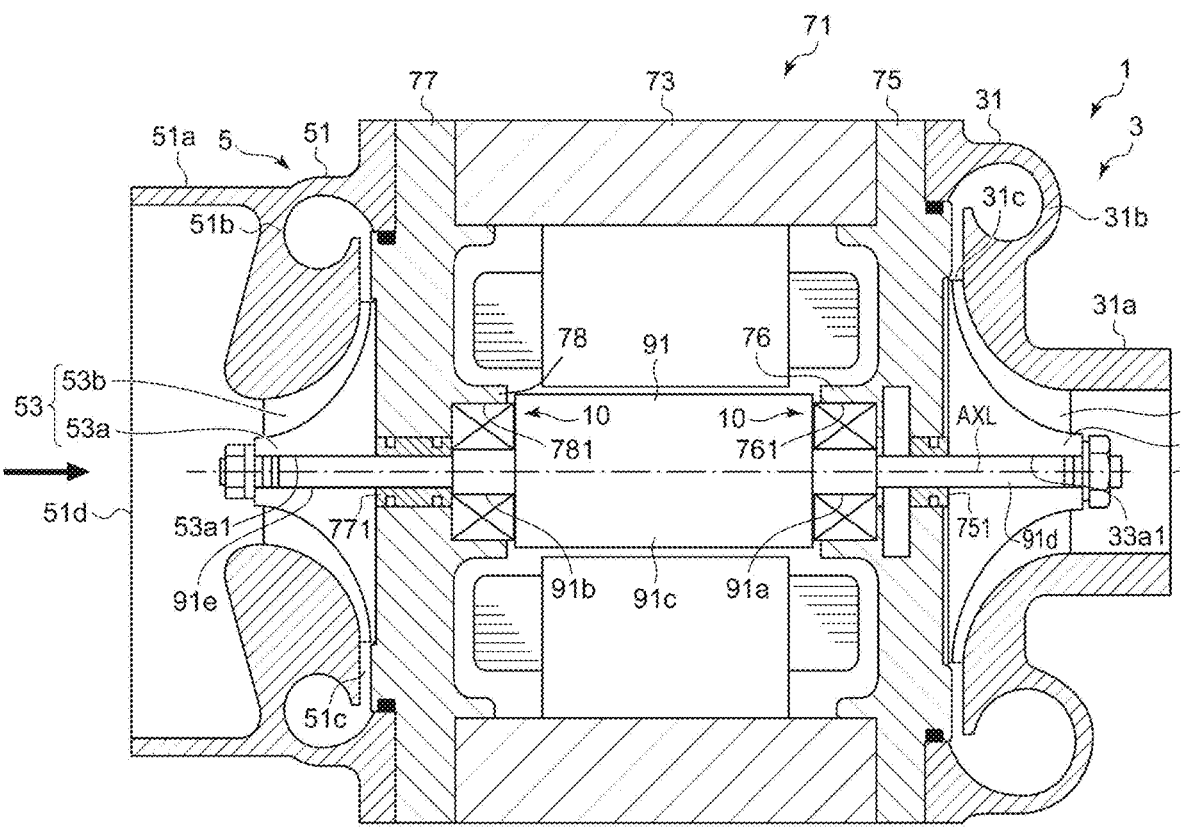
FIG. 1 is a cross-sectional view schematically showing the configuration of a turbocharger in which a gas bearing device is built according to an embodiment.

A gas bearing device and a turbocharger according to embodiments will be described below with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention.

FIG. 1 is a longitudinal cross-sectional view schematically showing the configuration of a turbocharger 1 in which a gas bearing device 10 is built according to an embodiment.

The turbocharger 1 with the built-in gas bearing device 10 according to the embodiment is mounted on, for example, an automobile engine. The turbocharger 1 includes a turbine 3 which rotates with a flow of an exhaust gas, and a compressor 5 which takes in and compresses air with the rotation of the turbine 3. The turbine 3 includes a turbine housing 31 and a turbine rotor blade 33 (turbine impeller) accommodated rotatably in the turbine housing 31, and the compressor 5 includes a compressor housing 51 and an impeller 53 (compressor impeller) accommodated rotatably in the compressor housing 51.

Each of the turbine housing 31 and the compressor housing 51 is fixed by a fastening member (such as a bolt) to a bearing housing 71 in which the gas bearing device 10 is built, and the turbine rotor blade 33 and the impeller 53 are coupled to each other by a rotational shaft 91 penetrating the inside of the bearing housing 71 (gas bearing device 10). Thus, the turbine rotor blade 33, the impeller 53, and the rotational shaft 91 are disposed on the same axis AXL. The turbine rotor blade 33 is rotated by an exhaust gas discharged from the automobile engine, for example, whereby the impeller 53 of is rotated via the rotational shaft 91 and supply air to be supplied to the automobile engine is compressed.

For example, the turbine housing 31 includes a cylindrical section 31a (shroud section) for accommodating the turbine rotor blade 33, and a scroll section 31b for surrounding a part of the cylindrical section 31a on a side of the bearing housing 71. The scroll section 31b has a non-depicted inlet of the exhaust gas, and is in communication with the cylindrical section 31a via a throat section 31c. An opening of the cylindrical section 31a on an opposite side from the bearing housing 71 forms an outlet 31d of the exhaust gas.

To an opening of the turbine housing 31 on the side of the bearing housing 71, an end wall 75 (turbine-side end wall) of the bearing housing 71 is fitted. The end wall 75 of the bearing housing 71 is fastened by a fastening member (for example, a bolt) to one end portion of a peripheral wall 73 (bearing housing body) formed into a cylindrical shape, and forms a part (end wall 75) of the bearing housing 71. The end wall 75 is provided with a seal section 751, the seal section 751 is formed with a seal hole penetrating the center of the end wall 75, and the rotational shaft 91 is disposed in the seal section 751.

For example, the compressor housing 51 includes a cylindrical section 51a (shroud section) for accommodating the impeller 53, and a scroll section 51b for surrounding a part of the cylindrical section 51a on the side of the bearing housing 71. The scroll section 51b has a non-depicted outlet of supply air, and is in communication with the cylindrical section 51a via a diffuser section 51c. An opening of the cylindrical section 51a on an opposite side from the bearing housing 71 forms an inlet 51d of the supply air.

To an opening of the compressor housing 51 on the side of the bearing housing 71, an end wall 77 (compressor-side end wall) of the bearing housing 71 is fitted. The end wall 77 of the bearing housing 71 is fastened by a fastening member (for example, a bolt) to another end portion of the peripheral wall 73 (bearing housing body), and forms a part (end wall 77) of the bearing housing 71. An annular seal section 771 is fitted in the end wall 77. The seal section 771 is formed with a seal hole penetrating the center, and the rotational shaft 91 is disposed in the seal section 771.

Inside the bearing housing 71, bearing sections 76, 78 are respectively disposed in the turbine-side end wall 75 and the compressor-side end wall 77, and the bearing sections 76, 78 are respectively formed with bearing holes 761, 781. The gas bearing devices 10 according to the present embodiment are respectively disposed as radial bearings in the bearing holes 761, 781, and the rotational shaft 91 is disposed in the bearing holes 761, 781 of the bearing sections 76, 78 while penetrating the gas bearing devices 10, respectively.

The rotational shaft 91 includes a pair of shaft sections 91a, 91b, an middle section 91c, a turbine rotor blade attachment section 91d, and a compressor impeller attachment section 91e. The pair of shaft sections 91a, 91b are sections disposed in shaft holes of the bearing sections 76, 78 while penetrating the gas bearing devices 10 respectively, and extend into the seal sections 751, 773 respectively. The middle section 91c is a section disposed between the pair of shaft sections 91a, 91b, has a larger diameter than the pair of shaft sections 91a, 91b, and is provided with a step at a boundary between the pair of shaft sections 91a, 91b. The turbine rotor blade attachment section 91d is a section disposed in an end portion on a side of the turbine 3, has a smaller diameter than the shaft section 91a, and is provided with a step between itself and the shaft section 91a. The compressor impeller attachment section 91e is a section disposed in an end portion on a side of the compressor 5, and as with the turbine rotor blade attachment section 91d, has a smaller diameter than the shaft section 91b and is provided with a step between itself and the shaft section 91b.

The turbine rotor blade 33 includes a hub 33a and a plurality of blades 33b. The hub 33a has a shape which is rotationally symmetric with respect to the axis AXL. One end side of the hub 33a is located on an outlet side of the exhaust gas, and another end side of the hub 33a is located on the side of the bearing housing 71, in a direction along the axis AXL. An outer peripheral surface of the hub 33a has a trumpet shape that widens from the one end side toward the another end side, and the hub 33a has on the another end side a back surface that faces the bearing housing 71.

The hub 33a has an attachment hole 33a1 penetrating the hub 33a along the axis AXL, and the attachment hole 33a1 has openings at both ends of the hub 33a. The plurality of blades 33b are integrally attached to the outer peripheral surface of the hub 33a, and is arranged at a predetermined interval in the circumferential direction of the hub 33a.

The impeller 53 includes a hub 53a and a plurality of blades 53b. The hub 53a has a shape which is rotationally symmetric with respect to the axis AXL. One end side of the hub 53a is located on a side of the inlet of the supply air, and another end side of the hub 53a is located on the side of the bearing housing 71, in the direction along the axis AXL. An outer peripheral surface of the hub 53a has a trumpet shape that widens from the one end side toward the another end side, and the hub 53a has on the another end side a back surface that faces the bearing housing 71 (end wall 75).

The impeller 53 includes a hub 53a and a plurality of blades 53b. The hub 53a has a shape which is rotationally symmetric with respect to the axis AXL. One end side of the hub 53a is located on a side of the inlet 51d of the supply air, and another end side of the hub 53a is located on the side of the bearing housing 71, in the direction along the axis AXL. An outer peripheral surface of the hub 53a has a trumpet shape that widens from the one end side toward the another end side, and the hub 53a has on the another end side a back surface that faces the bearing housing 71 (end wall 75).

The hub 53a has an attachment hole 53a1 penetrating the hub 53a along the axis AXL, and the attachment hole 53a1 has openings at the both ends of the hub 53a. The plurality of blades 53b are integrally attached to the outer peripheral surface of the hub 53a, and is arranged at a predetermined interval in the circumferential direction of the hub 53a.

Figure 2:
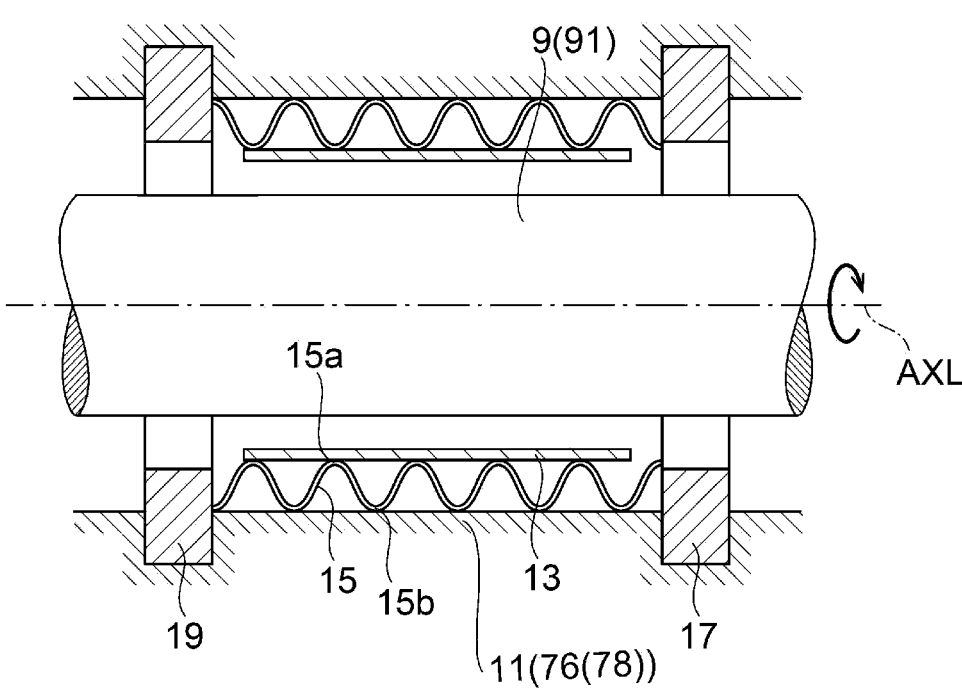
FIG. 2 is a longitudinal cross-sectional view schematically showing the configuration of the gas bearing device shown in FIG. 1.
Figure 3:
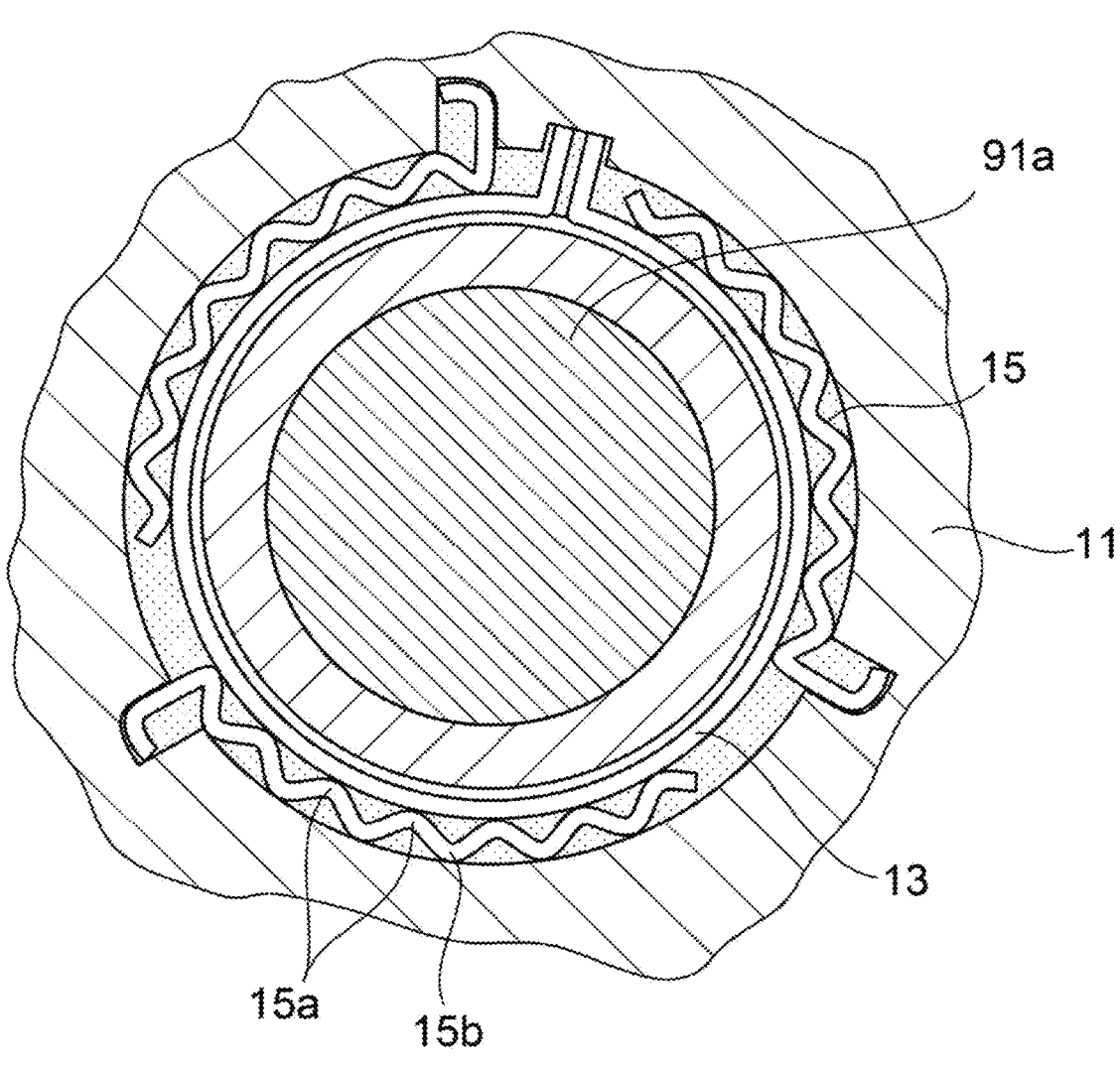
FIG. 3 is a transverse cross-sectional view schematically showing the configuration of the gas bearing device shown in FIG. 2.
Figures 1, 4:
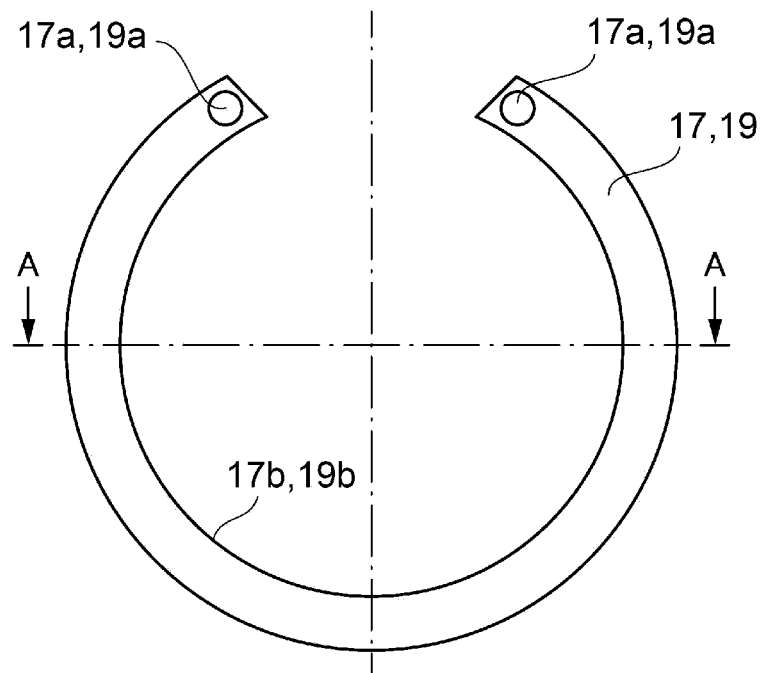
Figures 2, 4:
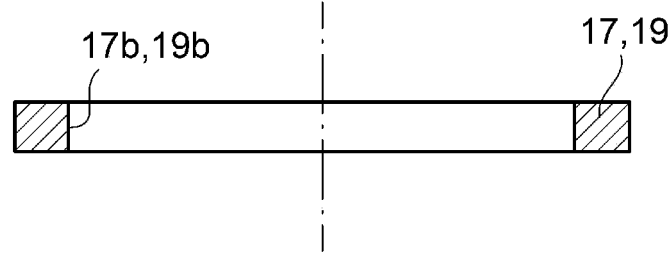

FIG. 2 is a longitudinal cross-sectional view schematically showing the configuration of the gas bearing device 10 shown in FIG. 1, and FIG. 3 is a transverse cross-sectional view schematically showing the configuration of the gas bearing device 10 shown in FIG. 2. FIG. 4-1 is a front view of a snap ring 17, 19 shown in FIG. 2, and FIG. 4-2 is a transverse cross-sectional view (cross-sectional view taken along line A-A) of the snap ring 17, 19 shown in FIG. 4-1.

As shown in FIGS. 2 and 3, the gas bearing device 10 is a bearing device for rotatably supporting a rotational shaft by using a gas as a working fluid, and includes the rotational shaft 9, a housing 11, a top foil 13, a back spring 15, and a pair of snap rings 17, 19.

The rotational shaft penetrates the housing 11. For example, the housing 11 is formed by the above-described bearing section 76 (78), and the rotational shaft is formed by the above-described rotational shaft 91.

The top foil 13 is disposed inside the housing 11 and has an annular shape surrounding an outer periphery of the rotational shaft 91.

The back spring 15 is disposed between the top foil 13 and the housing 11 (shaft hole), and has a plurality of crests 15a contacting the top foil 13 and a plurality of valleys 15b contacting the housing 11.

The pair of snap rings 17, 19 are fitted in shaft holes where the rotational shaft 91 of the housing 11 penetrates, and is configured to restrict movement of the back spring 15 in the axial direction of the rotational shaft 91. The pair of snap rings 17, 19 is a snap ring for hole, is fitted in a ring groove (circumferential groove) disposed in the shaft hole where the rotational shaft 91 of the housing 11 penetrates, and is fixed by an elastic restoring force of the snap ring 17, 19. As shown in FIG. 4, the pair of snap rings 17, 19 has a partially notched annular shape, is formed such that an outer circumference and an inner circumference are concentrically disposed, and has holes 17a, 19a for tool in both end portions of the notch.

Figure 5:
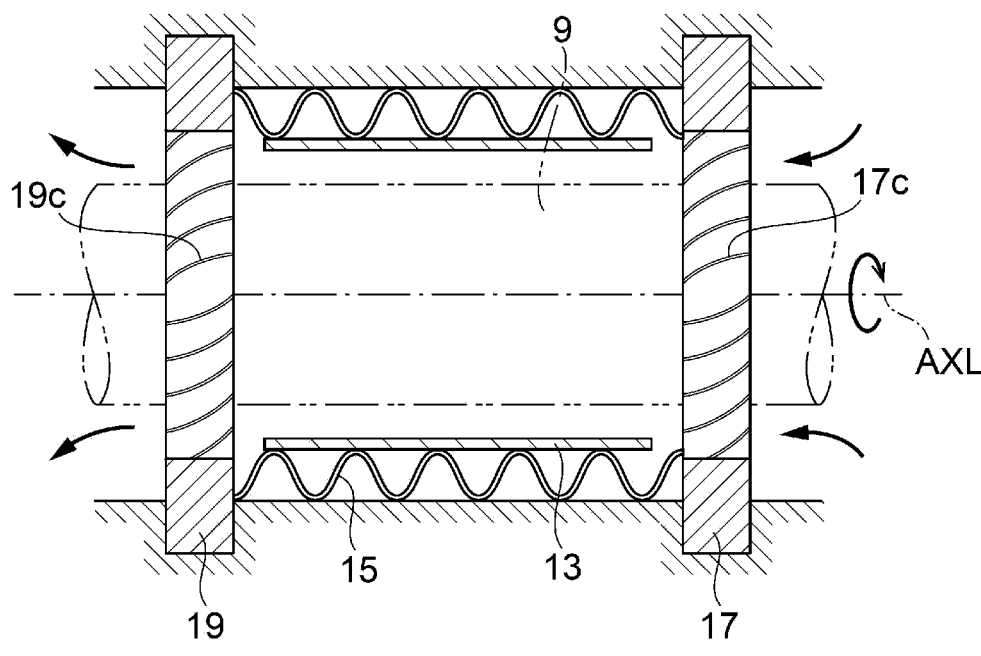
FIG. 5 is a view (cross-sectional view) showing an example in which turning grooves inclined with respect to an axis of the rotational shaft are disposed in both of a pair of snap rings.
Figure 6:
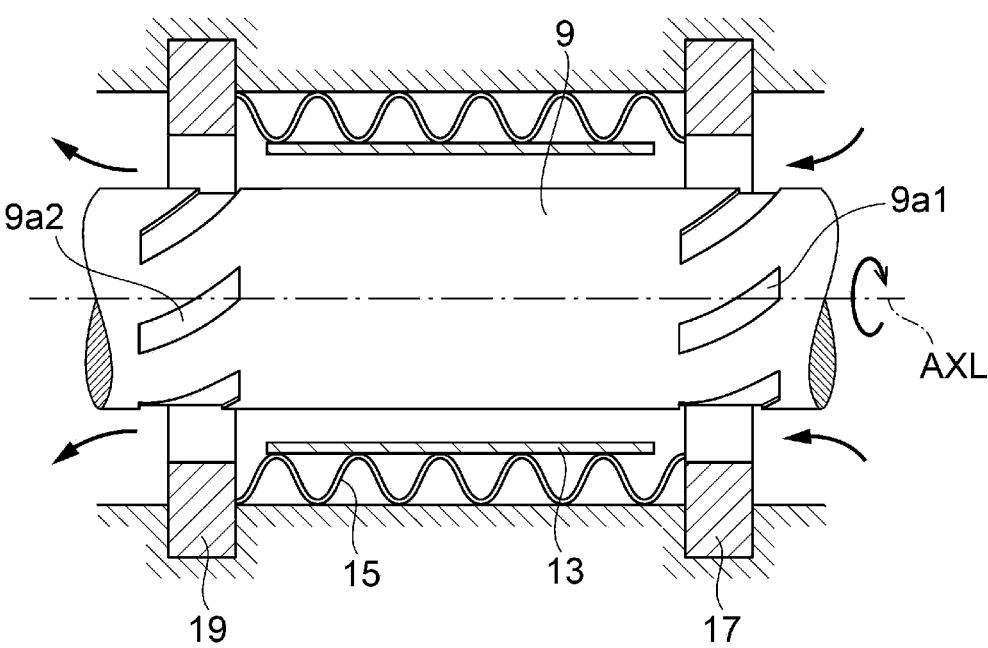
FIG. 6 is a view (cross-sectional view) showing an example in which turning grooves inclined with respect to the axis of the rotational shaft are disposed in the rotational shaft.

FIG. 5 is a view (cross-sectional view) showing an example in which a turning groove 17c, 19c inclined with respect to the axis AXL of the rotational shaft 91 is disposed in an inner periphery of each of the pair of snap rings 17, 19, and FIG. 6 is a view (cross-sectional view) showing an example in which turning grooves 9a1, 9a2 inclined with respect to the axis AXL of the rotational shaft 91 are disposed in the rotational shaft 91.

As shown in FIGS. 5 and 6, the gas bearing device 10 according to the embodiment has the turning groove 17c, 19c, 9a1, 9a2 inclined with respect to the axis AXL of the rotational shaft 91, in the inner periphery of at least one of the pair of snap rings 17, 19 or in a region of the rotational shaft 91 facing at least one of the pair of snap rings 17, 19.

For instance, in the example shown in FIG. 5, the turning groove 17c, 19c inclined with respect to the axis AXL of the rotational shaft 91 is disposed in the inner periphery of each of the pair of snap rings 17, 19. The turning groove 17c, 19c may form a spiral on the inner periphery of the snap ring 17, 19 or may form an airfoil on the inner periphery of the snap ring 17, 19, as long as air is introduced between the rotational shaft 91 and the top foil 13 by rotation of the rotational shaft 91.

For instance, in the example shown in FIG. 6, the turning groove 9a1, 9a2 inclined with respect to the axis AXL of the rotational shaft 91 is disposed in the region of the rotational shaft 91 facing each of the pair of snap rings 17, 19. The turning groove 9a1, 9a2 may form a spiral on an outer periphery of the rotational shaft 91 or may form an airfoil on the outer periphery of the rotational shaft 91, as long as air is introduced between the rotational shaft 91 and the top foil 13 by rotation of the rotational shaft 91.

With such configuration, since air is introduced between the rotational shaft 91 and the top foil 13 by rotation of the rotational shaft 91 and the rotational shaft 91 and the top foil 13 are cooled, it is possible to suppress a temperature rise of the top foil 13 due to a mechanical loss of the rotational shaft 91 of the rotational shaft 91.

As shown in FIG. 5, the turning groove 17c, 19c of at least one of the pair of snap rings 17, 19 is inclined in a direction opposite to a rotation direction of the rotational shaft 91 toward a region surrounded by the pair of snap rings 17, 19.

With such configuration, by rotation of the rotational shaft 91, air is introduced between the rotational shaft 91 and the top foil 13 by the turning groove 17c, 19c of at least one of the pair of snap rings 17, 19.

As shown in FIG. 6, the turning groove 9a1, 9a2 of the rotational shaft 91 is inclined in the same direction as the rotation direction of the rotational shaft 91 toward the region surrounded by the pair of snap rings 17, 19.

With such configuration, by rotation of the rotational shaft 91, air is introduced between the rotational shaft 91 and the top foil 13 by the turning groove 9a1, 9a2 of the rotational shaft 91.

Each of the pair of snap rings 17, 19 has an inner peripheral surface 17b, 19b with self-lubricating properties.

With such configuration, since inner peripheral surface 17b, 19b of each of the pair of snap rings 17, 19 has self-lubricating properties, the load of the rotational shaft 91 need not be supported only by the back spring 15 during low-speed rotation of the rotational shaft 91 and the support stiffness of the back spring 15 can be reduced. Whereby, the gas film can reliably be formed between the rotational shaft 91 and the top foil 13 during high-speed rotation of the rotational shaft 91. Further, by reducing the support stiffness of the back spring 15, the pair of snap rings 17, 19 support the rotational shaft 91 during low-speed rotation of the rotational shaft 91, and since the inner peripheral surface 17b, 19b of each of the pair of snap rings 17, 19 has self-lubricating properties, the pair of snap rings 17, 19 can reliably rotatably support the rotational shaft 91.

Each of the pair of snap rings 17, 19 is composed of a self-lubricating material.

With such configuration, since each of the pair of snap rings 17, 19 is composed of the self-lubricating material, the inner peripheral surface 17b, 19b of each of the pair of snap rings 17, 19 has self-lubricating properties. Whereby, it is possible to reduce the support stiffness of the back spring.

The self-lubricating material is a synthetic resin. For example, the synthetic resin is a high functional resin called engineering plastic, and for example, MC nylon, polyacetal (POM), etc. can be adopted.

With such configuration, each of the pair of snap rings 17, 19 is composed of the synthetic resin.

Figures 1, 7:
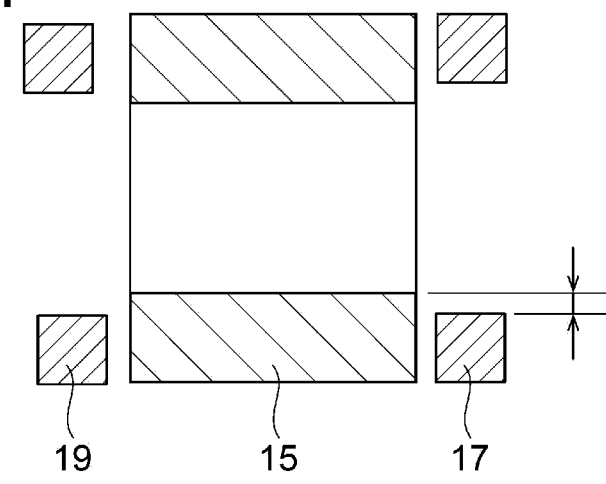
Figures 2, 7:
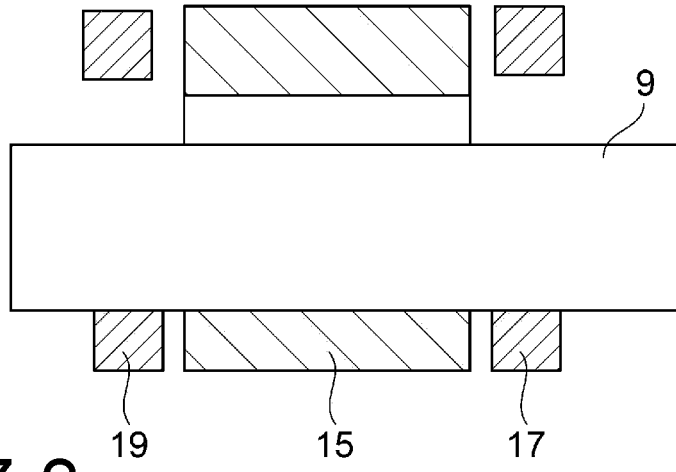
Figures 3, 7:
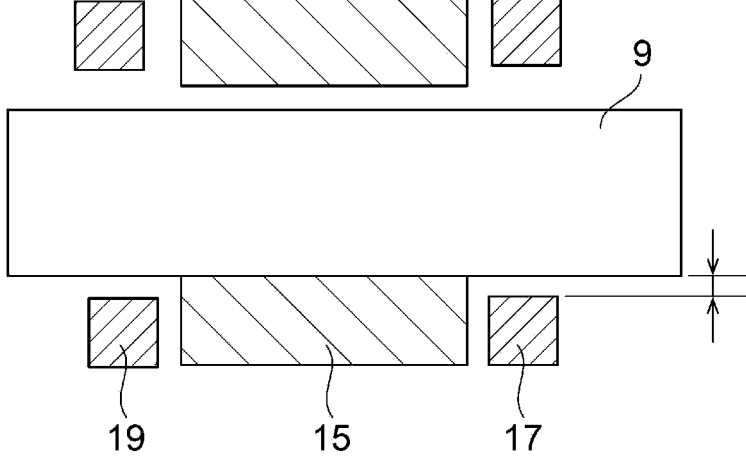
Figure 8:
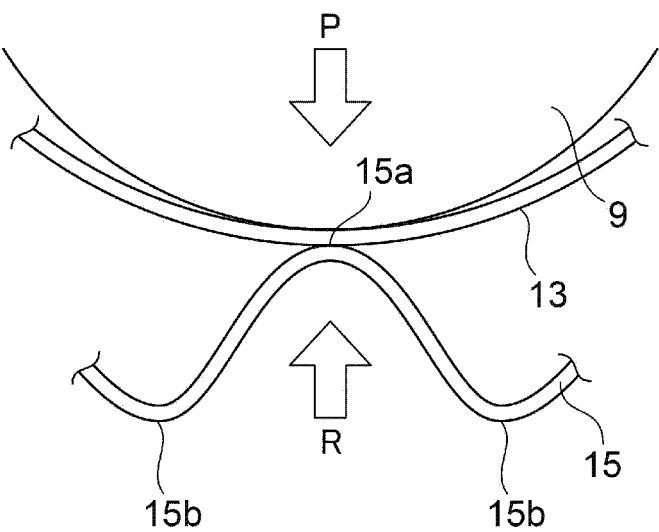
FIG. 8 is a view for describing support stiffness of the back spring.

FIG. 7 is a view (cross-sectional view) conceptually showing a relationship between the snap rings 17, 19 and the back spring 15, FIG. 7-1 is a view showing a state before the rotational shaft 91 is installed, FIG. 7-2 is a view showing a state during low-speed rotation of the rotational shaft 91, and FIG. 7-3 is a view showing a state during medium-speed rotation of the rotational shaft 91. Further, FIG. 8 is a view for describing the support stiffness of the back spring 15. Although the top foil 13 is omitted in FIG. 7, the top foil 13 is an essential component, and the omission does not mean that the top foil 13 is not the essential component.

As described above, if the inner peripheral surface 17b, 19b of each of the pair of snap rings 17, 19 has self-lubricating properties, as shown in FIG. 7-2, the load of the rotational shaft 91 need not be supported only by the back spring 15 and the support stiffness of the back spring 15 can be reduced. As shown in FIG. 8, the support stiffness of the back spring 15 is resistance to deformation of the back spring 15 and is a reaction force (R) obtained from the back spring 15 by the rotational shaft 91.

In the gas bearing device 10 where the support stiffness of the back spring 15 is reduced, as shown in FIG. 7-1, in the state before the rotational shaft 91 is installed, the height of the crest 15a of the back spring 15 has an equilibrium length and is located inward of inner peripheries of the snap rings 17, 19. As shown in FIG. 7-2, in the state where the rotational shaft 91 is installed, the rotational shaft 91 is supported by the back spring 15 and the snap rings 17, 19, and the height of the crest 15a of the back spring 15 is located at the same height as the inner peripheries of the snap rings 17, 19. Even in the state during low-speed rotation of the rotational shaft 91, the height of the crest 15a of the back spring 15 is located at the same height as the inner peripheries of the snap rings 17, 19, and the rotational shaft 91 is supported by the back spring 15 and the snap rings 17, 19. As shown in FIG. 7-3, in the state during medium-speed rotation of the rotational shaft 91, the rotational shaft 91 rises from the inner peripheries of the snap rings 17, 19 and the rotational shaft 91 is supported by the back spring 15. At this time, the height of the crest 15a of the back spring 15 is located inward of the inner peripheries of the snap rings 17, 19.

With such configuration, the gas film can reliably be formed between the rotational shaft 91 and the top foil 13 during high-speed rotation of the rotational shaft 91. Further, by reducing the support stiffness of the back spring 15, the pair of snap rings 17, 19 support the rotational shaft 91 during low-speed rotation of the rotational shaft 91, and since the inner peripheral surface 17b, 19b of each of the pair of snap rings 17, 19 has self-lubricating properties, the pair of snap rings 17, 19 can reliably rotatably support the rotational shaft 91.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

A gas bearing device (10) according to an aspect [1] is a gas bearing device using a gas as a working fluid, including: a rotational shaft (91); a housing (11) where the rotational shaft (91) penetrates; an annular top foil (13) disposed inside the housing (11) and surrounding an outer periphery of the rotational shaft (91); a back spring (15) disposed between the top foil (13) and the housing (11), and having a plurality of crests (15a) contacting the top foil (13) and a plurality of valleys (15b) contacting the housing (11); and a pair of snap rings (17, 19) fitted in shaft holes where the rotational shaft (91) of the housing (11) penetrates, and configured to restrict movement of the back spring (15) in an axial direction of the rotational shaft (91). The gas bearing device (10) has a turning groove (17c, 19c, 9a1, 9a2) inclined with respect to an axis of the rotational shaft (91), in at least one of the pair of snap rings (17, 19) or in a region of the rotational shaft (91) facing at least one of the pair of snap rings (17, 19).

With such configuration, since air is introduced between the rotational shaft (91) and the top foil (13) by rotation of the rotational shaft (91) and the rotational shaft (91) and the top foil (13) are cooled, it is possible to suppress a temperature rise of the top foil (13) due to a mechanical loss during rotation of the rotational shaft (91).

[2] A gas bearing device (10) according to another aspect is the gas bearing device (10) as defined in [1], wherein the turning groove (9a1, 9a2) of the rotational shaft (91) is inclined in the same direction as a rotation direction of the rotational shaft (91) toward a region surrounded by the pair of snap rings (17, 19).

With such configuration, by rotation of the rotational shaft (91), air is introduced between the rotational shaft (91) and the top foil (13) by the turning groove (9a1, 9a2) of the rotational shaft (91).

[3] A gas bearing device (10) according to another aspect is the gas bearing device (10) as defined in [1] or [2], wherein the turning groove (17c, 19c) of at least one of the pair of snap rings (17, 19) is inclined in a direction opposite to a rotation direction of the rotational shaft (91) toward a region surrounded by the pair of snap rings (17, 19).

With such configuration, by rotation of the rotational shaft (91), air is introduced between the rotational shaft (91) and the top foil (13) by the turning groove (17c, 19c) of at least one of the pair of snap rings (17, 19).

[4] A gas bearing device (10) according to another aspect is the gas bearing device (10) as defined in any one of [1] to [3], wherein each of the pair of snap rings (17, 19) has an inner peripheral surface (17b, 19b) with self-lubricating properties on the rotational shaft (91).

With such configuration, since the inner peripheral surface (17b, 19b) of each of the pair of snap rings (17, 19) has self-lubricating properties, the load of the rotational shaft (91) need not be supported only by the back spring (15) during low-speed rotation of the rotational shaft (91) and the support stiffness of the back spring (15) can be reduced. Whereby, the gas film can reliably be formed between the rotational shaft (91) and the top foil (13) during high-speed rotation of the rotational shaft (91). Further, by reducing the support stiffness of the back spring (15), the pair of snap rings (17, 19) support the rotational shaft (91) during low-speed rotation of the rotational shaft (91), and since the inner peripheral surface (17b, 19b) of each of the pair of snap rings (17, 19) has self-lubricating properties, the pair of snap rings (17, 19) can reliably rotatably support the rotational shaft (91).

[5] A gas bearing device (10) according to another aspect is the gas bearing device (10) as defined in [4], wherein each of the pair of snap rings (17, 19) is composed of a self-lubricating material.

With such configuration, since each of the pair of snap rings (17, 19) is composed of the self-lubricating material, the inner peripheral surface (17b, 19b) of each of the pair of snap rings (17, 19) has self-lubricating properties. Whereby, it is possible to reduce the support stiffness of the back spring (15).

[6] A gas bearing device (10) according to another aspect is the gas bearing device (10) as defined in [5], wherein the self-lubricating material is a synthetic resin.

With such configuration, each of the pair of snap rings (17, 19) is composed of the synthetic resin.

A turbocharger according to an aspect [7], includes: the gas bearing device (10) as defined in any one of the above [1] to [6].

With such configuration, since air is introduced between the rotational shaft (91) and the top foil (13) by rotation of the rotational shaft (91) and the rotational shaft (91) and the top foil (13) are cooled, it is possible to suppress a temperature rise of the top foil (13) due to a mechanical loss during rotation.

REFERENCE SIGNS LIST

1 Turbocharger
3 Turbine

31 Turbine housing
31a Cylindrical section (shroud section)
31b Scroll section
31c Throat section
31d Outlet of exhaust gas
33 Turbine rotor blade (turbine impeller)
33a Hub
33a1 Attachment hole
33b Blade
5 Compressor
51 Compressor housing
51a Cylindrical section (shroud section)
51b Scroll section
51c Diffuser section
51d Inlet of supply air
53 Impeller (compressor impeller)
53a Hub
53a1 Attachment hole
53b Blade
71 Bearing housing
73 Peripheral wall (bearing housing body)
75 End wall (turbine-side end wall)
751 Seal section
76 Bearing section
761 Bearing hole
77 End wall (compressor-side end wall)
771 Lid member
773 Seal section
78 Bearing section
781 Bearing hole
9a, 9a2 Turning groove
91 Rotational shaft
91a, 91b Shaft section
91c Middle section
91d Turbine rotor blade attachment section
91e Compressor impeller attachment section
10 Gas bearing device
11 Housing
13 Top foil
15 Back spring
15a Crest
15b Valley
17, 19 Snap ring
17a, 19a Hole for tool
17b, 19b Inner circumferential surface
17c, 19c Turning groove
AXL Axis

The invention claimed is:

1. A gas bearing device using a gas as a working fluid, comprising:
   a rotational shaft;
   a housing where the rotational shaft penetrates;
   an annular top foil disposed inside the housing and surrounding an outer periphery of the rotational shaft;
   a back spring disposed between the top foil and the housing, and having a plurality of crests contacting the top foil and a plurality of valleys contacting the housing; and
   a pair of snap rings fitted in shaft holes where the rotational shaft of the housing penetrates, and configured to restrict movement of the back spring in an axial direction of the rotational shaft,
   wherein the gas bearing device has a turning groove in a region of the rotational shaft facing each of the pair of snap rings,
   wherein the rotational shaft includes a first turning groove on one end side of the rotational shaft and a second turning groove on an opposite end side of the rotational shaft,
   wherein the first turning groove has: a first end adjacent to the back spring and the top foil; and a second end located on the one end side of the rotational shaft, and the second turning groove has: a third end adjacent to the back spring and the top foil; and a fourth end located on the opposite end side of the rotational shaft, and
   wherein the first turning groove extends from the first end to the second end in a circumferential direction about an axis of the rotational shaft, which is the same circumferential direction in which the second turning groove extends from the fourth end to the third end.

2. The gas bearing device according to claim 1,
   wherein each of the pair of snap rings has an inner peripheral surface with self-lubricating properties on the rotational shaft.

3. The gas bearing device according to claim 2,
   wherein each of the pair of snap rings is composed of a self-lubricating material.

4. The gas bearing device according to claim 3,
   wherein the self-lubricating material is a synthetic resin.

5. A turbocharger comprising:
   a gas bearing device according to claim 1.

* * * * *